(12) United States Patent
Parrish

(10) Patent No.: US 7,882,023 B2
(45) Date of Patent: Feb. 1, 2011

(54) METHOD AND SYSTEM FOR MANAGING COLLATERAL OR PROPERTY RISK IN A SECURED LOAN OR LEASE PORTFOLIO

(76) Inventor: Paul Parrish, 3050 Subine Hill, Henderson, NV (US) 89052

( * ) Notice: Subject to any disclaimer, the term of this patent is extended or adjusted under 35 U.S.C. 154(b) by 1310 days.

(21) Appl. No.: 10/913,278

(22) Filed: Aug. 6, 2004

(65) Prior Publication Data

US 2005/0288963 A1    Dec. 29, 2005

Related U.S. Application Data

(60) Provisional application No. 60/582,391, filed on Jun. 23, 2004.

(51) Int. Cl.
*G06Q 40/00* (2006.01)
(52) U.S. Cl. .............................. 705/38; 705/4
(58) Field of Classification Search .............. 705/35–42
See application file for complete search history.

(56) References Cited

U.S. PATENT DOCUMENTS

| 4,774,664 | A | * | 9/1988 | Campbell et al. | ............. | 705/38 |
| 5,802,501 | A | * | 9/1998 | Graff | ........................ | 705/36 R |
| 6,023,687 | A | * | 2/2000 | Weatherly et al. | ............. | 705/38 |
| 6,366,892 | B1 | * | 4/2002 | Altman et al. | ................ | 705/38 |
| 7,340,434 | B2 | * | 3/2008 | Schnall | ........................ | 705/38 |
| 2002/0010601 | A1 | * | 1/2002 | Taylor | ........................ | 705/4 |
| 2002/0138410 | A1 | * | 9/2002 | Siska | ........................ | 705/38 |
| 2004/0019557 | A1 | * | 1/2004 | Yaruss et al. | ................... | 705/38 |
| 2004/0059658 | A1 | * | 3/2004 | Sosville | ........................ | 705/35 |
| 2005/0071201 | A1 | * | 3/2005 | McNasby | ........................ | 705/4 |

OTHER PUBLICATIONS

"GMAC overcharged recipients of some car loans, judge rules", David Phelps, Star Tribune. Minneapolis, Minn: Nov. 9, 2000 p. 3.*
"State Motorists to face fees for insurance lapse", Florida Times Union. Jacksonville, Fla.: Feb. 27, 2004. p. B.8.*
Craig A Vermost. (Nov. 1998). Protecting the portfolio. American Agent & Broker, 70(11), 28-30+.*
"State Motorists to face fee for insurance lapse"; Florida Times Union. Jacksonville, Fla: Feb. 27, 2004. p. B.8.*
Richard White. (Jan. 31, 2004). Don't Let Condominium's Property Insurance Lapse :[Final Edition]. Tampa Tribune,p. 7.*

(Continued)

*Primary Examiner*—Ella Colbert
*Assistant Examiner*—Mohammad Z Shaikh
(74) *Attorney, Agent, or Firm*—Morishita Law Firm, LLC; Robert Ryan Morishita

(57) ABSTRACT

A method for managing collateral or property risk in a secured loan or lease portfolio includes monitoring the insurance status of each individual loan or lease. If insurance is not maintained as agreed by the borrower or lessee, a loan default or property protection fee is added to the loan or lease. The loan default or property protection fee is not allocated to an insurance premium but is used by the lender or lessor to offset expenses related to collateral or lease property damage. Optionally, the default provisions of the lending or lease agreement may be invoked if a maximum threshold level is reached while assessing the loan default or property protection fee. A system for implementing a method includes a loan or lease database and an insurance database. A data processor communicates with each database to determine whether the loan default or property protection fee is assessed.

20 Claims, 3 Drawing Sheets

OTHER PUBLICATIONS

Pa. could stop uninsured drivers with industry's help. (Jul. 9, 1997). Lancaster New Era, p. A-1.*

Christopher Rhoads. (Nov. 27, 1996). Trustmark in $8.8M Settlement Of Collateral Insurance Suit Series: 7. American Banker (pre-1997 Fulltext), p. 6.*

Sheila A. Albin, Chattel Lien Fund, Dec. 9, 1999, 3 pages.

Jonathan Sheldon, NAIC Creditor-Placed Insurance Model Act, Sep. 17, 1996, 10 pages.

* cited by examiner

METHOD AND SYSTEM FOR MANAGING COLLATERAL OR PROPERTY RISK IN A SECURED LOAN OR LEASE PORTFOLIO

RELATED APPLICATION DATA

The present application claims the priority of U.S. Provisional Application Ser. No. 60/582,391 entitled "Method and System for Managing Collateral or Property Risk in a Secured Loan or Lease Portfolio" filed Jun. 23, 2004 by Applicant herein.

FIELD OF THE INVENTION

The present invention relates to secured loan and lease transactions. Specifically, the present invention is a method and system that tracks the insurance status on collateral and flags non-compliant accounts for alternate treatment including charging a loan default or property protection fee.

BACKGROUND OF THE INVENTION

Most borrowers are familiar with the concept of a "secured" loan. A secured loan is a loan that includes a lender holding legal title to a piece of collateral until the borrower repays the loan. When the borrower repays the loan, legal title to the collateral reverts to the borrower. A common form of property purchased under such terms is an automobile. A similar transaction is a lease transaction in which a lessor holds legal title to property during the term of the lease. When the lessee completes the lease obligation, the lessee generally has an option to purchase and own the property. Again, a common type of property purchased under such terms is an automobile.

In a common automotive loan, the lender pays the sale price to the seller of the automobile and holds legal title to the automobile. The borrower has equitable title to, and physical possession of, the automobile. Thus, the automobile is the collateral on the loan. The borrower repays the lender on a predetermined schedule that typically includes interest charged over the life of the loan. Leases work in a similar fashion, except that equitable title does not exist. The transaction is similar to a "rental" agreement for a specified term. Generally, the lessee will have the option to purchase the property at the culmination of a lease arrangement.

In either case, if the borrower defaults on the loan or lease agreement, i.e. fails to uphold the loan or lease agreement, the lender or lessor has the right to repossess the collateral, i.e. gain physical possession of the automobile. The lender then disposes of the collateral to recoup as much of the loan balance or property value as possible. It is not unusual, however, that the amount recouped is much less than the loan balance or expected property value, often due to damage to the automobile.

In most respects, the borrower treats the collateral or lease property as his or her own. In fact, most, if not all, secured automobile loans and leases require the borrower to maintain a minimum level of insurance against damage to the automobile. That is, the lender has an interest in making sure that the collateral is in good condition because, should the collateral be damaged, the lender would be even less likely to be able to recoup the loan balance or expected property value in the event of a default. The consequence of the borrower not maintaining insurance, however, is not always uniform. As a general matter, so long as the borrower is repaying the loan, the bare fact that the borrower has not maintained insurance may not be enough cause for most lenders, to repossess the collateral. The decision is purely a matter of risk management style though.

Nevertheless, the lender or lessor, in most cases, must take some steps to protect itself from the effects of damage to the collateral or lease property. Some lenders and lessors maintain a "blanket" insurance policy covering all collateral on all secured loans funded. Claims are submitted to the insurer when the lender or lessor becomes aware of damage to its collateral or lease property, usually upon repossession and just prior to asset liquidation. Typically, none of this blanket premium cost is passed on to borrowers.

One drawback to this method is that the blanket insurance policy has been maintained on all the collateral or lease property within the portfolio, without regard to whether the borrower or lessee maintained insurance on the collateral. Generally, the premiums paid for the blanket insurance is typically much greater than the claims paid for damage to the collateral. A typical ratio of claims recovered to premiums paid runs between 50-75%.

An alternate method known in the prior art is "force-placed" insurance. The force-placed method tracks the insurance activity within a lender's or lessor's portfolio to ensure that insurance coverage has remained in place. If a borrower's or lessee's insurance has lapsed, a notice is sent out to the borrower reminding the borrower or lessee to obtain coverage immediately. If the borrower or lessee fails to comply, the lender or lessor purchases an insurance policy and adds the insurance premium to the borrower's loan balance or lease requirement.

The drawback of this method is that it is expensive to the borrower or lessee, since premiums often run to 14-18% of the loan balance, and to the lender or lessor, since much of these premium amounts will be uncollectible from the borrower or lessee and will, consequently, need to be paid to the insurance company by the lender or lessor.

Another drawback to this method is that many borrowers and lessees have been confused by the limited benefits of such force-placed insurance policies and assume that the benefits of the borrower's or lessor's insurance and the benefits of a force-placed policy are the same. In fact, the coverage is usually limited to collision coverage, primarily to protect the lender's or lessor's interest in the collateral or lease property. In other words, the premium for the force-placed insurance policy is relatively high and is paid by the borrower or lessee with the primary benefit to the lender or lessor. As a result, a number of complaints and lawsuits regarding the disclosure required to inform the borrower or lessee of the limitations of force-placed insurance policies have made some lenders and lessors wary of such a method. Nevertheless, many lenders and lessors still use this method widely in the industry.

Another method used on a very limited basis is a fee assessed to every borrower or lessee that applies for a loan or lease. Typically, this fee is assessed at the time of the loan or lease. The drawbacks of this method include: (a) all borrowers or lessees are required to pay the fee without regard to whether the borrower or lessee maintained the required insurance and (b) the fee is assessed at the beginning of the loan or lease rather than at the time of, and upon the condition of, the lapse or impairment of insurance. Thus, this method is unfair to borrowers who abide by the terms of the loan agreement. This method is also likely to cause the lender or lessor to become uncompetitive in the marketplace.

It can be seen, therefore, that there is a need in the art for a new method and system for protecting collateral in a secured loan.

SUMMARY OF THE INVENTION

The present invention is a method and system for improving the ability of a lender or lessor, i.e. the owner of property, to manage its property risk with respect to a borrower or lessee, i.e. the possessor of property. The method includes monitoring the insurance status of each individual loan or lease. Optionally, the insurance status is stored in a database.

The insurance status includes at least whether the property is included in an insurance policy. In the event that insurance status does not meet a defined minimum standard as agreed by the borrower or lessee, a loan default or property protection fee is added to the loan or charged within the lease, optionally after a warning to the borrower or lessee that the lapse could result in action by the lender or lessor. Optionally, the loan default or property protection fee is added to a periodic payment paid by the borrower or lessee to the lender or lessor. It is noted that the method may include notifying the borrower or lessee in a lending or lease agreement that a loan default or property protection fee may be assessed in the event that insurance lapses or becomes impaired.

The loan default or property protection fee is not allocated to an insurance premium. That is, the loan default or property protection fee is not used to alter the insurance status by purchasing insurance against damage to the collateral or lease property. Rather the loan default or property protection fee is used by the lender or lessor to offset expenses related to collateral damage. Optionally, the loan default or property protection fee is allocated to income to the lender or lessor.

In one optional embodiment, the loan default or property protection fee is assessed periodically until insurance coverage on the collateral or lease property is reestablished or the loan or lease amount is repaid, whichever occurs first. In an alternate optional embodiment, however, a maximum threshold level is calculated. The maximum threshold level may be calculated using factors such as the size of the fee, the status of the loan, the assessed risk, and the like. The fee is charged periodically until the maximum threshold level is reached. Once the maximum threshold level is reached, the default provisions of the lending or lease agreement are invoked, such as by repossessing the collateral or lease property.

The present invention is also a system for implementing such a method. A system includes a database of property covered by loans or leases and a database of insurance status. A data processor communicates with each of the databases and compares the database of loans or leases to the database of insurance status. When the data processor detects that insurance status on collateral or lease property from the database of loans or leases does not meet a minimum standard, i.e. has lapsed or has become impaired, the loan or lease is flagged for assessment of a loan default or property protection fee. As noted above, the data processor may selectively assess the loan default or property protection fee until instructed otherwise or until the loan or lease amount is repaid. In an alternate optional embodiment, a maximum threshold level is calculated and the loan default or property protection fee is applied until the maximum threshold level is reached. At the maximum threshold level, the loan is flagged for invocation of the loan or lease default provisions.

DESCRIPTION

Figure 1:
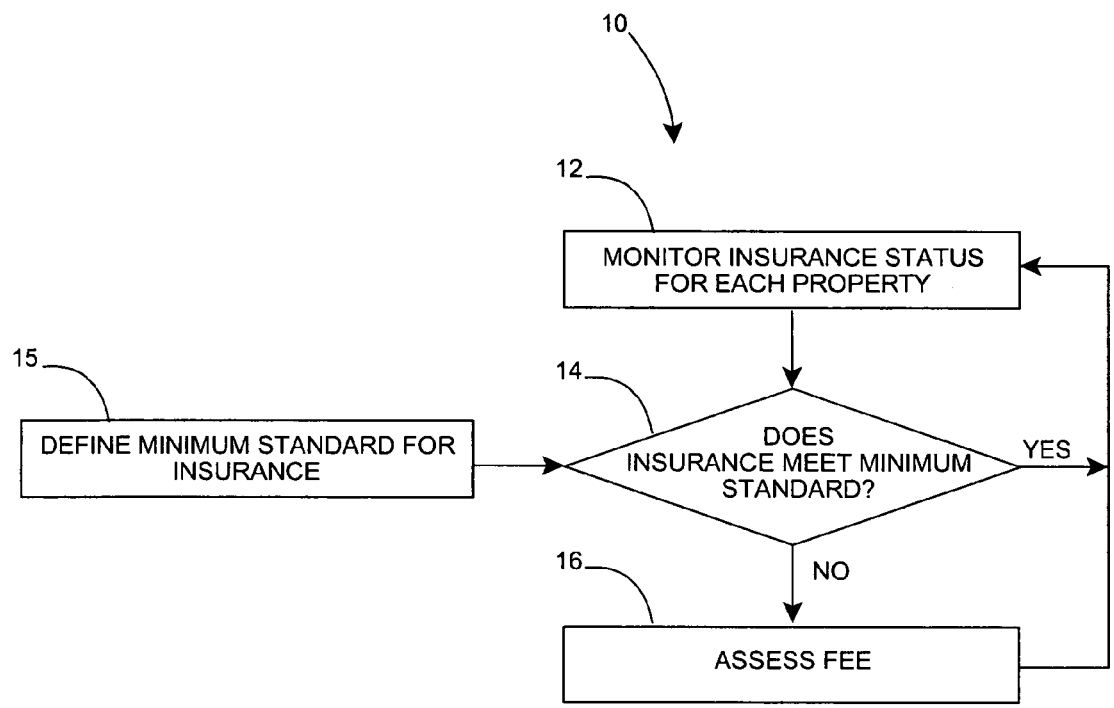
FIG. 1 is a flowchart of a method according to an embodiment of the present invention.
Figure 2:
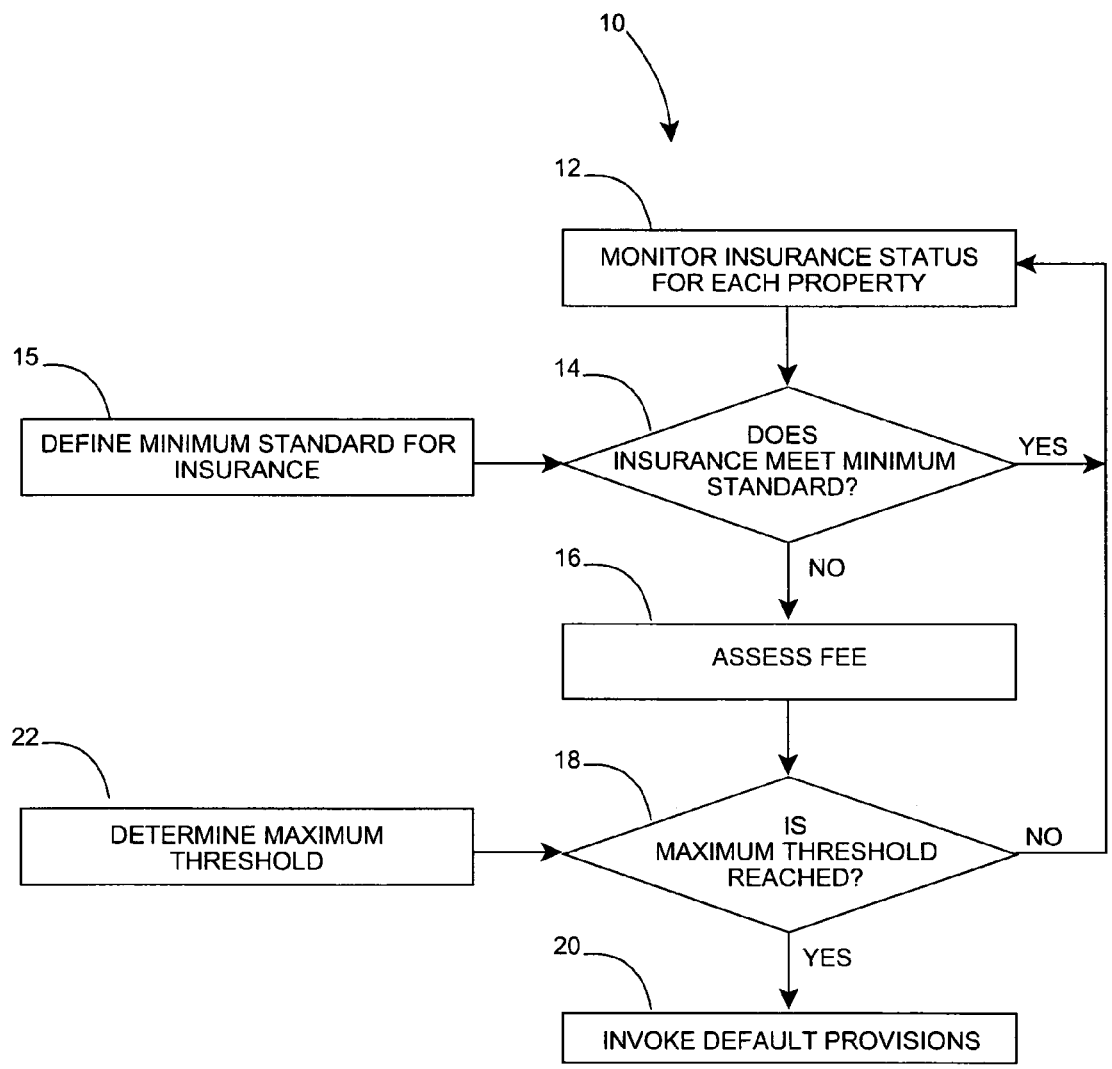
FIG. 2 is a flowchart of a method according to an alternate embodiment of the present invention.

Reference is now made to the figures wherein like parts are referred to by like numerals throughout. Turning to FIGS. 1 and 2, the present invention is a method 10 for managing risk associated with property. Examples of property for which risk could be managed could include collateral securing a secured loan or lease property leased under a lease agreement. In describing the present method, the general setting is that of a loan agreement between a borrower and a lender for a loan amount or that of a lease agreement between a lessee and a lessor for a lease amount. The borrower or lessee could be any individual or entity that enters into the loan agreement or lease agreement, respectively, and possesses the property. For this reason, the borrower or lessee could also be referred to as the possessor of the property. Similarly, the lender is contemplated to be any individual or entity that loans the loan amount to the borrower under the loan agreement and a lessor is contemplated to be any individual or entity that leases the lease property to the lessee under the lease agreement, and consequently owns the property. For this reason, the lender or lessor could also be referred to as the owner of the property. The term "collateral" refers to the property securing the loan amount and the term "lease property" refer to the property leased to the lessee. "Collateral" and "lease property" could refer to any type of real or personal property, such as consumer goods, automobiles, or any other property. The term "default" generally refers to a failure by the borrower or lessee to abide by the loan or lease agreement, respectively.

Implementing the present method 10 may include informing the borrower or lessee through the loan or lease agreement of the implementation of the present method. Specifically, the present method 10 may include warning the borrower or lessee that a loan default or property protection fee, described in greater detail below, may be assessed to the borrower or lessee in the event that the insurance status of the property fails to meet a minimum standard. For example, the insurance status could fail to meet a minimum standard if an insurance policy covering damage to the collateral or lease property is not maintained as agreed. This could include lapse of insurance, but could also include such impairments to insurance as obtaining insurance with policy limits or deductibles different from the terms required under the loan or lease agreement.

A minimum standard for the insurance status is defined 15 and the insurance status of each of the property is monitored 12. Again, the property in question could be the property covered by the lender's loans or lessor's leases. Some specific examples of how this monitoring 12 may take place are given below. The monitoring 12 could occur in any fashion, including at continuous, regular periodic, or irregular time intervals. In an optional embodiment, the monitoring 12 takes place at regular intervals, such as monthly.

The result of the monitoring 12 is a determination 14 whether the insurance status of the property meets a defined 15 minimum standard. For example, the monitoring 14 could determine whether the insurance policy on each piece of collateral securing the lender's loans is in force as agreed. If it is determined 14 that the insurance status of the property meets a minimum standard, i.e. the insurance policy on the collateral for any loan or lease property for any lease is still in force under the agreed terms, no action is taken and the monitoring 12 continues. Conversely, if it is determined 14 that the insurance status of the property fails to meet a minimum standard, i.e. the insurance policy on the collateral for any loan or lease has lapsed or become impaired, a loan default or property protection fee is assessed 16 to the borrower or lessee on that loan or lease. Stated another way, if a borrower allows the insurance on the collateral securing that borrower's loan to lapse or otherwise become impaired or a lessee allows the insurance on the lease property to lapse or otherwise become impaired, a loan default or property protection fee is assessed 16 to that borrower or lessee. So long as a borrower maintains the insurance on the collateral securing his loan or a lessee maintains the insurance on the lease property, the borrower or lessee is not assessed 16 a loan default or property protection fee. In an optional embodiment, a borrower may be warned prior to the assessment 16 of the loan default or property protection fee.

The loan default or property protection fee could take any form and be of any size. For example, in an optional embodiment, the loan default or property protection fee is added to the periodic payment due on the loan repayment or lease payment schedule. In an alternate optional embodiment specifically directed to loans, the loan default or property protection fee may be added to the loan amount. Similarly, it is contemplated that the loan default or property protection fee may be fixed, based on the loan or lease amount, based on the loan balance or lease, based on the collateral value, based on the loan or lease payment, or any other amount. For example, the loan default or property protection fee could be $10.00 for every $1,000.00 borrowed at the time of the insurance lapse or impairment.

The loan default or property protection fee itself is not used to alter the insurance status by purchasing an insurance policy or pay insurance premiums on the property. Rather, the loan default or property protection fee is allocated to income to the lender or lessor and used to offset expenses incurred in repairing damaged collateral or lease property. In fact, by implementing the method 10 of the present invention, a lender or lessor may be able to cancel the blanket insurance policy used to insure all collateral securing the loans of the lender's portfolio or lease property of the lessor's portfolio. In an optional embodiment, the lender or lessor may elect to use a catastrophic collateral insurance policy to cap the potential losses. This would not affect the insurance status of the individual pieces of property but would be directed to the lender's or lessor's portfolio as a whole.

In an optional embodiment, such as that shown in FIG. 1, the loan default or property protection fee is assessed 16 until the insurance status again meets a minimum standard, i.e. the agreed insurance on the collateral or lease property is obtained, or the loan or lease is repaid, whichever occurs first. Thus, in such an embodiment, the loan default or property protection fee would be assessed 16 until the lender or lessor confirms, either through monitoring 12 or through documentation provided by the borrower or lessee, that insurance on the collateral or lease property is again in force under the terms agreed.

In an alternate embodiment, shown in FIG. 2, the method 10 may include determining 22 a maximum threshold level. This maximum threshold level could take any form, including a dollar amount, time period, or any other measure. In such an embodiment, the method 10 includes determining 18 whether a maximum threshold level in assessing 16 the loan default or property protection fee has been reached. If so, the lender or lessor may invoke 20 the default procedures under the loan or lease agreement.

For example, in one optional embodiment, the maximum threshold level is a time period, such as four months. In such an example, if the borrower or lessee fails to obtain the agreed insurance for a period of four months, i.e. the loan default or property protection fee is assessed for four months, and there is a loan balance or lease obligation remaining at the end of the maximum threshold level of four months, the lender or lessor may invoke the default procedures in the loan or lease agreement including repossession of the collateral or lease property, respectively.

This generally summarizes the method 10 aspect of the present invention. The system 30 of the present invention is generally directed to implementing the method 10 of the present invention.

Figure 3:
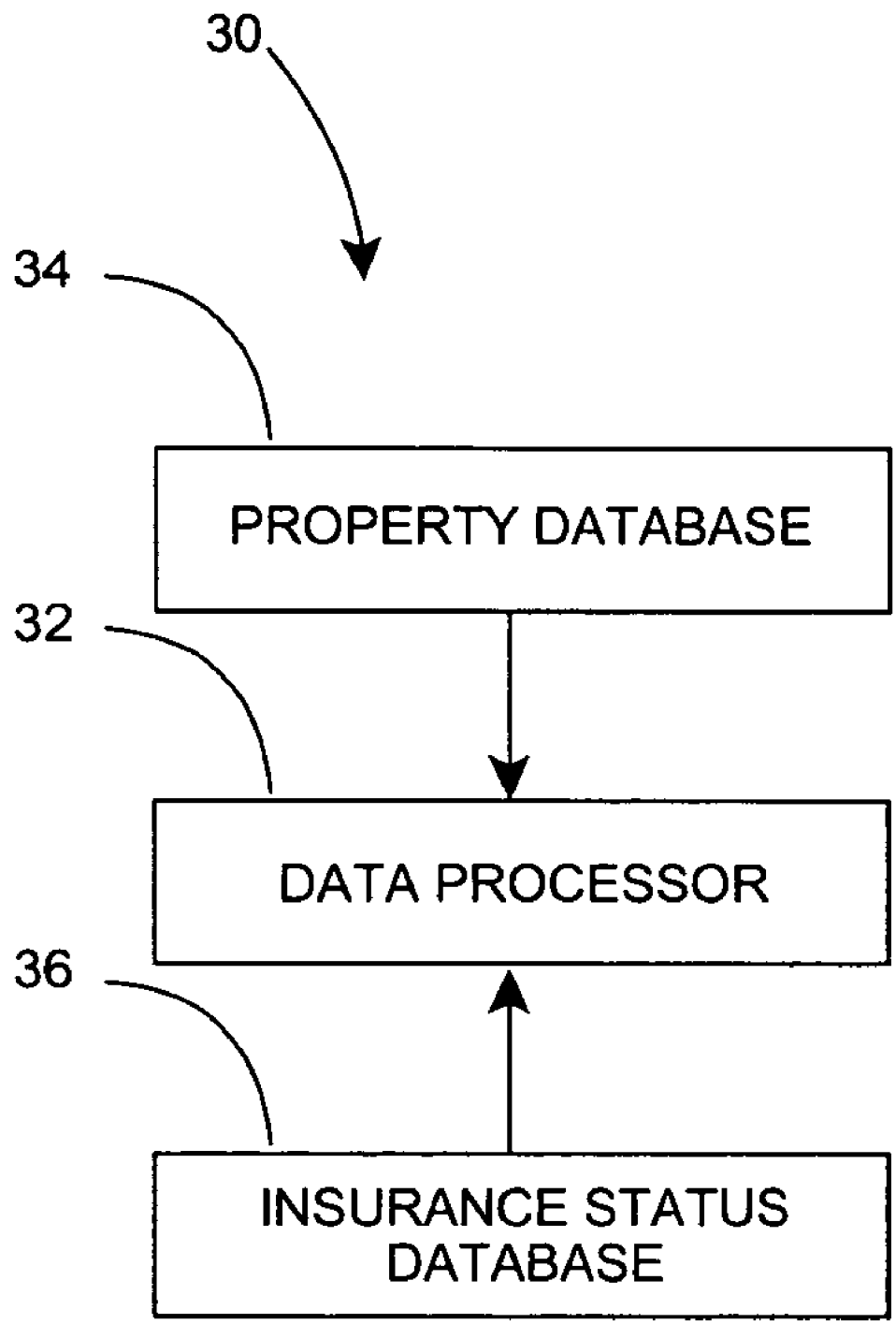
FIG. 3 is a block diagram of a system according to an embodiment of the present invention.

Referring to FIG. 3, a system 30 according to the present invention includes a data processor 32. The data processor 32 may take any form including the CPU of a general purpose computer. The data processor 32 communicates with, and receives data from, at least one data structure storing a property database 34 containing information on property covered by the loans or leases of the lender's or lessor's portfolio and an insurance database 36 storing information on the insurance status of various collateral and lease property. The property database 34 and insurance database 36 could be stored together or separately on any data storage medium including magnetic storage, optical storage, electrical storage, flash storage, or any other type of data storage. Moreover, the property database 34 and insurance database 36 could be stored locally or remotely and could be accessed by the data processor 32 through any means including through a data bus, modem, network connection, Internet connection, or any other data communication. In one optional embodiment, the property database 34 is stored locally and the insurance database 36 is stored remotely, such as any of the insurance databases 36 generally accessible to the industry.

Referring generally to FIGS. 1-3, the data processor 32 executes instructions in the form of software, firmware, or other executable or readable instructions. The data processor 32 determines 14 whether the collateral securing the loans or the lease property covered in the leases in the loan or lease database 34 is insured by monitoring 12 the insurance status of the collateral or lease property. While this could be accomplished in many different ways, in one optional embodiment, the data from the property database 34 is compared to the data from the insurance database 36. If the insurance status on the collateral for any of the loans, or the lease property for any of the leases, in the property database 34 fails to meet the minimum standard because, for example, the insurance on the property has lapsed or otherwise become impaired, the loan associated with the uninsured or under-insured collateral, or the lease associated with the uninsured or under-insured lease property, is flagged for assessment 16 of a loan default or property protection fee. As noted above, the loan default or property protection fee may be assessed 16 until the loan or lease is repaid or insurance on the collateral or lease property is obtained as shown in the optional embodiment of FIG. 1. Also, as noted above, an alternate optional embodiment may include the use of a maximum threshold level. In such an optional embodiment, shown in FIG. 2, the lender or lessor may invoke 20 the default provisions of the loan or lease agreement if a predetermined 22 maximum threshold level is reached 18.

It should be noted that the system of the present invention is not necessarily a unitary system that is operated at a single location by a single operator. To the contrary, it is contemplated that one or more steps of the method 10 may be performed by affiliates to the lender or lessor, rather than the lender or lessor itself. Thus, various portions of the system 30 may be utilized by an affiliate to the lender or lessor, while other portions of the system 30 may be utilized by the lender or lessor itself. For example, the lender or lessor could contract with an affiliate to monitor the insurance status of the collateral securing the loans while the lender or lessor itself handles the actual assessment and collection of the loan default or property protection fee. However, it is also noted that the present invention is not limited to any particular division of steps of the method 10 or elements of the system 30.

While certain embodiments of the present invention have been shown and described it is to be understood that the present invention is subject to many modifications and changes without departing from the spirit and scope of the claims presented herein.

I claim:

1. A method directed to managing risk associated with a secured loan or lease transaction consisting of property possessed by a possessor making payment to an owner of said property for said possession, comprising:
    communicating instructions by a system having a data processor to the at least one data storage medium to store at least insurance and property data;
    storing among said property data a record of said property as possessed by a possessor making payment to an owner of said property for said possession;
    storing among said insurance data an insurance status associated with said property wherein said insurance status indicates at least whether said property is in included in an insurance policy;
    storing in said data storage medium a minimum standard for said insurance status maintained by said possessor on said property;
    monitoring by said data processor, said insurance database stored at said data storage medium to determine the insurance status of said property as maintained by said possessor on said property; and
    when the insurance status of said property does not meet said minimum standard,
    (a) charging by said data processor a predefined fee to said possessor payable to said owner in addition to said payment without allocating by said data processor said fee payable to said owner to alter said insurance status with respect to said owner, and (b) continuing by said data processor said secured loan or lease transaction with said property remaining in the possession of the possessor for at least a defined period of time until a default under said secured loan or lease transaction occurs, wherein said failure of said insurance status to meet said minimum standard is not, by itself, a default under said secured loan or lease transaction for updating said property data by said data processor to deprive said possessor of possession of said property.

2. The method of claim 1 wherein said minimum standard is whether said property is included in said insurance policy.

3. The method of claim 1 wherein said insurance status further identifies a policy limit of said insurance policy for said property and said minimum standard is a predefined value for said policy limit such that said insurance status would fail to meet said minimum standard if the insurance policy associated with said property in said insurance database has a policy limit that fails to meet said predefined value.

4. The method of claim 1 wherein said insurance status further indicates a deductible of said insurance policy for said property and said minimum standard is a maximum quantity for said deductible.

5. The method of claim 1 further comprising, when said insurance status of said property does not meet said minimum standard, said data processor executing programming instructions to notify said possessor of said property prior to charging said fee.

6. The method of claim 1 further comprising said data processor executing programming instructions to periodically charge said fee until said insurance status meets said minimum standard.

7. The method of claim 1 further comprising: storing at said data storage medium a maximum threshold level for said fee; and said data processor executing programming instructions to periodically charge said fee until said maximum threshold level is met or exceeded.

8. A method directed to managing risk associated with a secured loan or lease transaction consisting of property recorded in said property, database as possessed by a possessor making payment to an owner of said property for said possession, comprising:
    communicating instructions by a system having a data processor to at least one data storage medium to store at least insurance data and property data;
    storing among said property data a record of said property as possessed by a possessor making payment to an owner of said property for said possession;
    associating said property with an insurance status indicating at least whether said property is included in an insurance policy by said possessor;
    storing said insurance status among insurance data;
    defining a minimum standard for said insurance status maintained by said possessor on said property and storing said minimum standard at said data storage medium;
    monitoring said insurance data stored at said data storage medium by said processor to determine the insurance status of said property as maintained by said possessor;
    and wherein the insurance status of said property does not meet said minimum standard; and when the insurance status of said property does not meet said minimum standard,
    (a) said data processor charging by said data processor a predefined fee to said possessor payable to said owner in addition to said payment without allocating by said data processor said fee payable to said owner to alter said insurance status with respect to said owner, and (b) continuing by said processor said secured loan or lease transaction with said property remaining in the possession of the possessor for at least a defined period of time until a default under said secured loan or lease transaction occurs, wherein said failure of said insurance status to meet said minimum standard is not, by itself, a default under said secured loan or lease transaction updating said property database data by said data processor to deprive said possessor of possession of said property.

9. The method of claim 8 wherein said minimum standard is whether said property is included in said insurance policy.

10. The method of claim 8 wherein said insurance status further identifies a policy limit of said insurance policy for said property and said minimum standard is a quantity predefined value for said policy limit such that said insurance status would fail to meet said minimum standard if the insurance policy associated with said property in said insurance database has a policy limit that fails to meet said predefined value.

11. The method of claim 8 wherein said insurance status further indicates a deductible of said insurance policy for said property and said minimum standard is a maximum quantity for said deductible.

12. The method of claim 8 further comprising, when said insurance status of said property does not meet said minimum standard, said data processor executing programming instructions to notify said possessor of said property prior to charging said fee.

13. The method of claim 8 further comprising said data processor executing programming instructions to periodically charge said fee until said insurance status meets said minimum standard.

14. The method of claim 8 further comprising: storing at said data storage medium a maximum threshold level for said fee; and said data processor executing programming instructions to periodically charge said fee until said maximum threshold level is met or exceeded.

15. A system for managing risk associated with a secured loan or lease transaction consisting of property possessed by a possessor making payment to an owner of said property for said possession, comprising:

at least one data storage medium including a data structure adapted to store a property database including at least said property and an insurance database of the insurance status maintained by said possessor on said property, said insurance status indicating at least whether said property is included in an insurance policy maintained by said possessor;

a data processor in communication with said data storage medium, said data processor adapted to execute programming instructions to compare said property database to said insurance database and determine whether the insurance status of property stored in said insurance database meets a predefined minimum standard, and when said insurance status of said property does not meet said minimum standard, (a) said data processor is adapted to execute programming instructions to charge a predefined fee to said possessor in addition to said payment without allocating said fee to alter said insurance status with respect to said owner, and (b) said data processor is adapted to execute programming instructions enabling said secured loan or lease transaction to continue with said property remaining in the possession of the possessor for at least a defined period of time until a default under said secured loan or lease transaction occurs, wherein (c) said failure of said insurance status to meet said minimum standard is not, by itself, a default under said secured loan or lease transaction for said data processor to update said property database to deprive said possessor of possession of said property.

16. The system of claim 15 wherein said minimum standard is whether said property is included in said insurance policy.

17. The system of claim 15 wherein said database of insurance status further stores a policy limit of said insurance policy for said property and said minimum standard is a predefined value for said policy limit such that said insurance status would fail to meet said minimum standard if the insurance policy associated with said property in said insurance database has a policy limit that fails to meet said predefined value.

18. The system of claim 15 wherein said database of insurance status further stores a deductible of said insurance policy for said property and said minimum standard is a maximum quantity for said deductible.

19. The system of claim 15 further comprising said data processor adapted to execute programming instructions to periodically charge said fee until said insurance status meets said minimum standard.

20. The system of claim 15 further comprising said data processor determining a maximum threshold level for said fee and executing programming instructions to periodically charge said fee until said maximum threshold level is met or exceeded.

* * * * *